United States Patent [19]

Sjöblom

[11] Patent Number: 5,350,907
[45] Date of Patent: Sep. 27, 1994

[54] HANDLING SYSTEM FOR INFORMATION CARRIERS

[75] Inventor: Hans O. Sjöblom, Stockholm, Sweden

[73] Assignee: Utvecklings AB Jonic, Stockholm, Sweden

[21] Appl. No.: 910,098
[22] PCT Filed: Jan. 15, 1990
[86] PCT No.: PCT/SE90/00032
§ 371 Date: Jul. 8, 1992
§ 102(e) Date: Jul. 8, 1992
[87] PCT Pub. No.: WO91/10971
PCT Pub. Date: Jul. 25, 1991

[51] Int. Cl.⁵ .............................................. G06K 5/00
[52] U.S. Cl. ..................................... 235/380; 235/492
[58] Field of Search ................................ 235/492, 380

[56] References Cited

U.S. PATENT DOCUMENTS 5,017,766  5/1991  Tamada et al. ........................ 235/492
5,053,608  10/1991 Senanayake ........................... 235/492
5,086,216  2/1992  Mollet et al. .......................... 235/492

FOREIGN PATENT DOCUMENTS 0291834  11/1988  European Pat. Off. .
3632294  4/1988   Fed. Rep. of Germany .

Primary Examiner—Harold Pitts
Attorney, Agent, or Firm—Merchant, Gould, Smith, Edell, Welter & Schmidt

[57] ABSTRACT

A handling system for information carriers such as a credit card and the like includes information storing means such as a chip circuit and the like. The credit card, when not used, is to be unserviceable. To activate the credit card to a serviceable condition, there is introduced into the chip circuit, by a code transmitter, one or more states of authority, which are adapted to be read by a transceiver device included in a press copying machine for the credit card. The authority information received is arranged to be indicated at the press copying machine. The press copying operation is also arranged to control the transceiver device such that a signal is transferred to the chip circuit to extinguish the state therein, that is to deactivate the credit card after authority indication.

11 Claims, 2 Drawing Sheets

HANDLING SYSTEM FOR INFORMATION CARRIERS

TECHNICAL FIELD

The present invention relates to apparatus and systems for cooperation with credit cards and the like. In the present context the term credit card is intended to cover all forms of information carriers which are portable and which can receive and give off information.

PRIOR ART

Nowadays various forms of identity and credit cards are generally used, most of them including, besides visually readable information such as the card holder's name etc., some form of information carrier, which could be read by electronic means. The information carrier usually comprises a tape of magnetic material into which a signal code is introduced. The code is readable for identification purposes by electromagnetic means and electronic apparatus connected thereto. An example is so called "Bankomat ™" or ATM (Automatic Teller Machine) cards and card reading machines associated therewith.

There are also credit cards and identification documents today which include electronic circuits, so called chips, which in turn include memory and signal processing circuits. These chips are provided with means for receiving and emitting signals from and to outside transmission means. Consequently, by means of this technique information can be stored in the memory of the chip circuits, to be utilized in various ways. Among the public such credit cards are now called "smart cards" or IC-cards. The advantage of using a smart card for applications such as credit cards is that direct information of the holder's credit worthiness can be obtained at the point of use, provided that the point of use concerned is connected to a banking centre, e.g. via modems and telecommunication networks. For example, such communication can be used to establish that the purchase sum at any time of buying is automatically deducted from the credit amount available, and that the new available credit amount is stored in the memory of the chip circuit to be used at the next point of purchase.

A credit card used in this way will of course provide excellent security to shopkeepers as well as to the bank, inasmuch as control functions can be established in a very reliable way. The level of security in the present connection is thus very high. However, a considerable disadvantage of a system as disclosed above is the fact that each point of sale has to be equipped with a terminal connected by modems to a banking centre, e.g. by way of telecommunication circuits or leased circuits. As a matter of course it will be very costly for a department store to install a terminal at every cash desk. Also, the loading of the telecommunication network will also be considerable. Such systems have been tested in practice and have been found to be secure but they are, as stated, expensive to install as well as to run. The credit cards proper, however, are comparatively cheap to produce, even if they are provided with a chip.

In today's situation a credit card can be used repeatedly once over if an unauthorized person gets control of it. The period of time before one manages to freeze a card can vary from a few hours to a week, which of course is very unfavorable to the card holder. The economical loads on card holders as well as on account card enterprises are considerable. Therefore, much would be gained if a level of security could be attained in everyday handling which approaches that exhibited by the smart credit cards described above. It is particularly essential to prevent unauthorized persons from using another person's credit card.

SUMMARY OF THE INVENTION

The present invention is based upon a novel idea, namely, that a credit card or similar information carrier invalid for payment as long as the card holder does not take special measures to bring the card into a state of validity. According to the invention the card holder has at his disposal a code transmission apparatus which can communicate with a memory circuit included in the credit card or the like in order to transfer a specific validity code to render the card serviceable. A credit card brought into this state of validity can then be put in cooperation with a further transmission apparatus, e.g. mounted in a so called imprinter at a point of sale used to read the memory contents of the chip circuit. The transmission circuit is designed to extinguish, after having received the validity code, the memory contents of the chip circuit. The procedure thus described is arranged to trigger indicating means so that the point of sale or the like concerned will provide an indication that the card is valid as a means of payment. When the card is given back to the card holder there are thus no validity markings. Therefore, if some unauthorized person should get control of the card, since any corresponding apparatus at any point of sale would give rise to an indication of invalidity, the card cannot be used. As can be seen, the credit card will remain completely unfit for use as long as the card holder does not activate the card.

The characterizing features of the present invention will appear from the patent claims that follow.

The invention will be described in greater detail with reference to the accompanying drawings which show and exemplify an embodiment of the invention.

DESCRIPTION OF EMBODIMENTS

Figure 1:
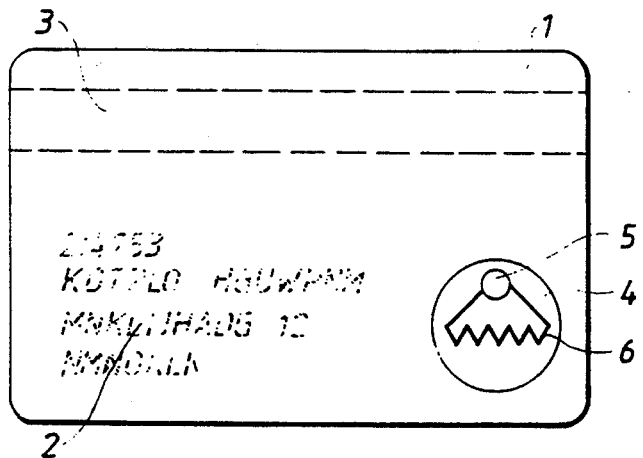
FIG. 1 shows a credit card having an internal chip circuit.

The credit card 1 shown in FIG. 1 is provided in the usual way with markings for identification, generally impressed and stating the owner's name and identification number. The reverse side of the credit card 1 may contain a magnetic strip 3 intended to cooperate with reading means, for example, occurring in connection with "Bankomat ™" or ATM terminals. The credit card also includes a chip circuit 4 with a signal transferring means 5 and a memory circuit 6. The chip circuit also contains signal processing units, but for the sake of clarity such circuit members have been omitted. Consequently the chip circuit is illustrated completely diagrammatically.

Figure 2:
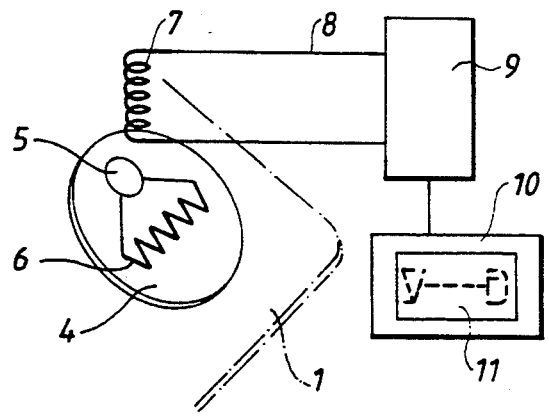
FIG. 2 shows diagrammatically the chip circuit according to FIG. 1 in communicative cooperation with a transmission device for signal transfer.

As pointed out in the introduction a chip circuit can be supplied with state signal which can be stored in its memory. FIG. 2 shows a transmission device for the inductive transfer of state signals to the chip circuit proper. In order that state signals are transferred via a coil 7 used for inductive cooperation with the signal transferring means 5. Said coil 7 is in communication, by cables 8, with a transceiver arrangement 9 including signal processing circuits. The arrangement 9 communicates with an indicator means 10 including a display screen 11. By activating the transceiver arrangement 9 activating signals can be transferred inductively by way of coil 7 to the receiving means 5. These activating signals in turn activate the chip circuit in order to permit the storage of the validation state signal to memory circuit 6. The communication can be bidirectional, that is, upon certain commands the chip circuit can respond and submit to the transceiver arrangement 9 a state signal which can be visualized on the display 11. Consequently, information can be stored in the memory circuit 6 which is significant to the use of the credit card in connection with e.g. a terminal.

Figure 3:
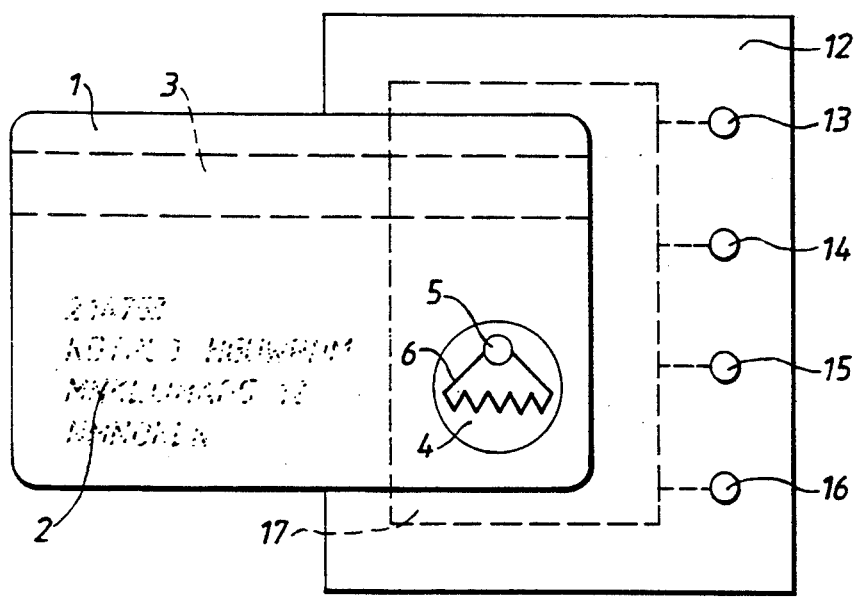
FIG. 3 shows the credit card according to FIG. 1 with its chip circuit in cooperation with an activating device.

As stated above the essence of the invention resides in the feature that credit card 1 or some other information carrier, is, in its normal condition, inactive or that credit card 1 exhibits some state of information indicating that it is unserviceable. This means that the card has to be activated, that is, the credit card 1 has to be brought into a state where it can be used as means of payment. To this end the card is presented to an activating device. Such an activating device is illustrated in FIG. 3 and designated 12. The activating device includes four operating keys 13, 14, 15, 16 each connected to a signal processing and transmitting circuit 17 included in the activating device. Although not shown in detail the circuit 17 includes similar devices as those shown in FIG. 2, that is coil 7, cables 8 and transceiver arrangement 9, for cooperation with receiving means 5 in chip circuit 4. FIG. 3 illustrates how the credit card is brought together with the activating device so that signals can be transferred from the activating circuit to the memory 6 of the chip circuit 4. Introducing a code signal sequence forming a state of activation in the memory 6 could suitably be triggered by a specific sequential depressing of the operating keys 13-16. For example, to the card holder may key an operating sequence such as first the operating key 15 is depressed, then 13, followed by 14 and 16. After such an operation a state signal has thus been transferred to the memory circuit 6, and the card is now activated. The user can thus remove the activated card from the activating device 12 and present the card to a point of sale as a means of payment.

Figure 4:
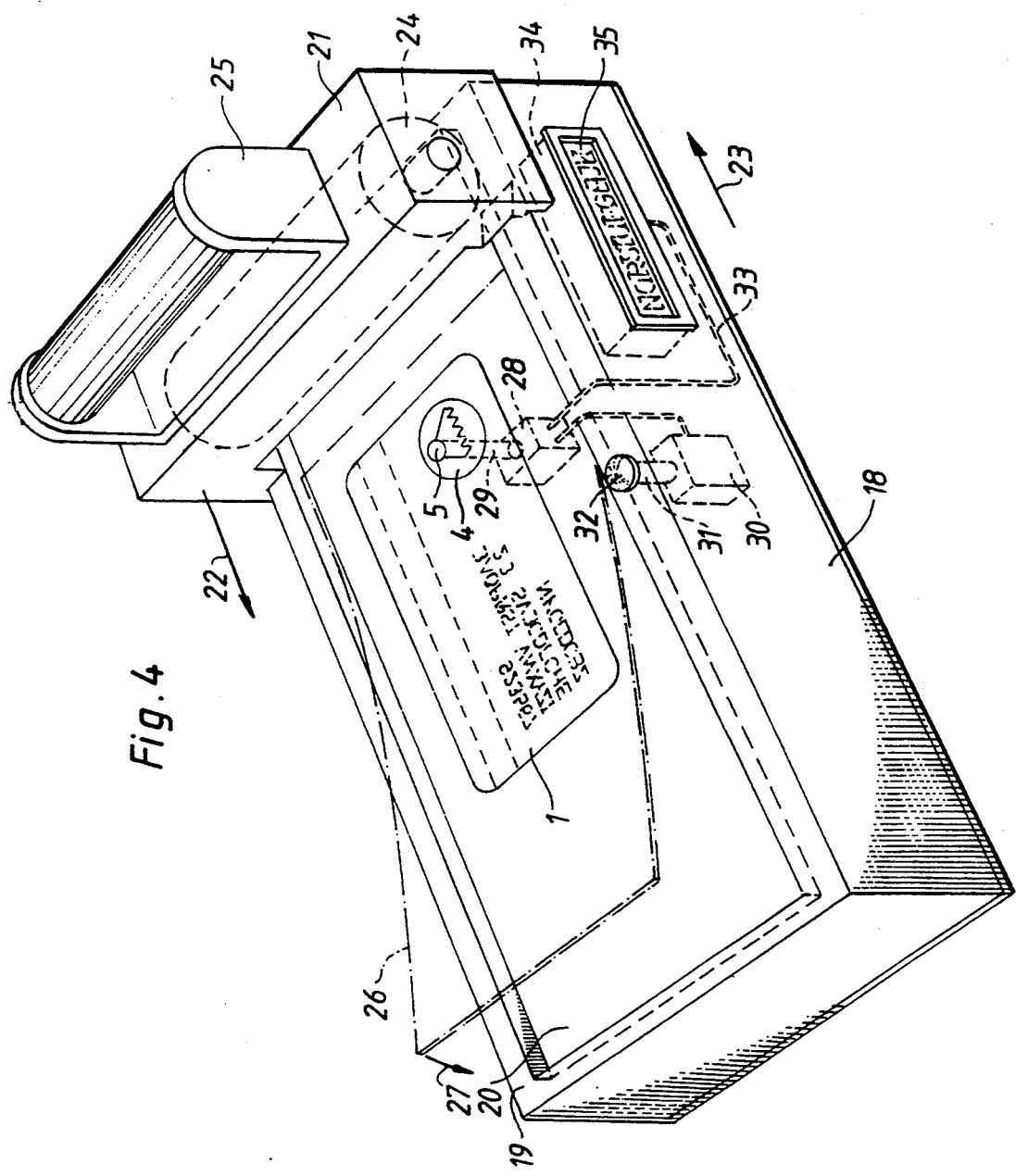
FIG. 4 shows diagrammatically and in perspective a press copying machine for credit cards equipped in accordance with the present invention and including signal transmission devices for communication with the chip circuit.

By way of example, in FIG. 4 there is diagrammatically shown a press copying machine, i.e. a device for transferring by pressure embossed information from a credit card to a bundle of debiting and checking blanks for the customer to confirm and attest. The press copying machine 18 shown in the figure has the form of a box having an upper frame 19 defining a lowered surface 20 with a recess for receiving the credit card 1 concerned. On the edges 19 of the frame a press copying mechanism 21 is arranged slidable and displaceable along the box in the directions of arrows 22 and 23. The press copying mechanism 21 includes in the usual manner a pressure roll 24 and an operating handle 25 at the top. By dot-dashed lines there is indicating said bundle of checking and debiting blanks 26 to be inserted in the direction of arrow 27 on top of the credit card and onto the lowered surface 20. In operating the mechanism 21, i.e. displacing it in the direction of arrow 22, the pressure roll 24 will press the blanks against the credit card and perform imprinting, However, in accordance with the present invention the machine 18 illustrated is provided in its box-shaped part with a transceiver device 28 and associated transmission details 29. The apparatus now described is located such that communication can be established between the chip circuit 4 and the transceiver device 28. A change-over switch 30 is connected to the transceiver device 28 by a cable 29, the switch having an operating rod 31 carrying an operating button 32 projecting somewhat above the surface of the frame 19. The device 28 communicates by a cable 33 with an indicating device 34 with an indicating display screen 35.

It is assumed, as described in connection with FIG. 3, that the activated credit card is inserted into the press copying machine 18 shown in FIG. 4 on the spot marked for the purpose, after which the bundle of debiting blanks 26 is inserted and the pressure mechanism 21 set in motion in the direction of arrow 22 by the handle 25 being operated. According as the mechanism slides along the two sides of the frame 19 the pressure roll 24 will press the bundle 26 against the credit card and impression occurs as usual. When the pressure mechanism 21 has arrived to the operating button 32 this will be actuated by a force causing the switch 30 to be reversed, which has the effect that the transceiver device 28 is started and emits an inquiry signal sequence which is transferred to the chip circuit 4 in the manner previously disclosed. Hereby the chip circuit arrives into an operating state and makes the contents of memory circuit 6 available to the transceiver device 28. The state previously applied to the memory 6 of the chip circuit is now communicated to the device 28 which will read said state. If the state exhibits a predetermined value, a signal is transmitted to the indicating unit 34. Then the display 35 is being lit and an indication shows, for example, by the letters "Valid", that the credit card in question is serviceable. When the pressure device 21 has been pushed all the way to the opposite end of the machine 18 the operating push button 32 is again released and the transceiver circuit 28 returns to a resting position. In order to make it possible to remove the bundle 26 the pressure mechanism 21 has to be returned to the starting position shown in FIG. 4. In doing so the pressure mechanism 21 will again actuate the operating button 32 with the result that the transceiver 28 is switched to transmitting position. A code signal is then emitted and transmitted to the chip circuit 4, said code signal causing the state earlier applied to the memory 6 to be extinguished. Hence, when the credit card is given back to the customer it is unfit for use (invalid) but, still, it has served its purpose by having given the point of sale a go-ahead signal to the effect that it has been possible to use the card at the moment of sale. The credit card can now be kept by the card holder without being under any particular supervision, as the card, should it be used improperly at any point of sale, would be unable to create any go-ahead signal on the indicating display 35.

As shown, a credit card, otherwise a valuable item attracting thieves, can be made worthless in a very simple way, as the user normally maintains the credit card inactive, that is, unserviceable. A press copying machine equipped in a manner shown in FIG. 4 represents a modest investment indeed in comparison with the installation of a bank associated terminal with modems and the like at every point of sale. As pointed out earlier security will of course not be quite the same as when point of sale terminals are used. Still, however, misuse of the credit card by unauthorized persons can be largely prevented and at a lower cost.

In order to further raise the safety level such solutions can of course be conceived where the credit card magnet strip 3 mentioned earlier is read by means, not shown in detail, when the pressure mechanism 21 is displaced. Then the code information obtained by reading the contents of the magnet strip 3 together with code contents of the memory 6 of the chip circuit 4 can form parameters for a comparison of information, which in turn can result in triggering the indicating device 34 so that the display 35 will indicate a serviceable credit card. In such a connection the security level will of course be raised considerably.

Within the scope of the invention the security level can be raised further by the following measures relating to the press copying machine proper. As mentioned before the contents of the memory 6 of the chip circuit 4 is read in connection with the credit card being press copied. Besides the fact that a state is imparted to the memory indicating that the card is serviceable it is conceivable that information has been introduced into the memory about the recording of the credit card with the credit card company concerned. Such information can be readily stored in a memory in the means 28. As mentioned before, returning the press copying mechanism 21 is intended to bring about elimination of the state in the chip memory 6. Simultaneously with this operation a random number generator (not shown) component of the means 28 can be started, said generator being coded by the credit card company. Then joint operation of the credit card information and the random number code will advise that the card besides being serviceable also is valid, a piece of information which is valuable to the point of sale and which also constitutes to the credit card company a confirmation of transaction. As a matter of fact, if necessary the memory contents can be periodically read by the credit card company when the press copying machine is checked, e.g. at service.

Triggering the code for extinguishing the state introduced into the memory 6 of the chip circuit 4 can of course be brought about in another way than by actuating again the change-over switch 30 when the mechanism 21 is returned to its starting position. For example, reading the state per se could form the basis of triggering the extinguishing procedure by making the card chip circuit react on the reading operation performed at the second code transmission device. The essential point is that the card is unfit for use when removed from the machine 18.

Within the scope of the invention the state(s) imparted to the memory 6 to make the card serviceable can include further information possibly necessary to the points of sale. In such cases the indicating unit is to be adjusted to growing demands for information, As a matter of course, the activating device 12 shown in FIG. 3 could be designed in many ways within the scope of the invention. Suitably it is made planar in order to both fit a credit card and a place where it is kept, e.g. a wallet. It is conceivable that the introduction of states can be initiated by other means than by push buttons 13-16. Here modern techniques offer many solutions. Suitably the chip circuit is designed such that a state transferred thereto and stored therein has a timely limited duration in order to prevent unauthorized use of an activated card during a period of time longer than that requested for concluding a normal registration procedure at a point of sale.

I claim:

1. Handling system for information carriers, in particular so called credit cards and the like, comprising:
    information storing means being externally communicated;
    a first state imparting device;
    a second state receiving and digesting device;
    said information storing means being brought to communicate with the first and second devices in such a way that said first device imparts to the information storing means at least one state which, when the information storing means cooperates with said second device, is read and computed by said second device;
    wherein the information storing means includes a chip circuit having a signal processing unit, and a memory circuit;
    wherein said first state imparting device is arranged as a signal transmitter, the signal transmitter being in cooperation with the information storing means to activate the information storing means by inputting a code of authority state through operation means, the code of authority being arranged to be released by a sequential actuation of operating means; and
    said second receiving and digesting device including an information reader and a signal transmitter, the information reader and the chip circuit initiating an elimination code to eliminate a state signal in the memory circuit of the information storing means upon detecting and reading a correct authority code.

2. Handling system according to claim 1, wherein the signal transmitter initiates an input of a different state after the code of authority state has been detected.

3. Handling system according to claim 1, wherein the signal processing of the information storing means detects a content of the authority code and initiate an elimination of said authority code in the memory circuit of the information storing means.

4. Handling system according to claim 1, wherein the chip circuit includes timing means for emitting an elimination code to eliminate the authority code which is stored in the memory circuit.

5. Handling system according to claim 1, wherein said first state imparting device includes a first transmission device having said operating means and a transmitter circuit for releasing and transmitting a plurality of code signals to the information storing means to generate at least one state.

6. Handling system according to claim 1, wherein said second state receiving and digesting device includes a second transmission device having said signal transmitter, said second transmission device locks and stores information from the information storing means for further handling of transmitting.

7. Handling system according to claim 1, wherein said second state receiving and digesting device is disposed in a press copying machine for credit cards and the like, said second state receiving and digesting device includes a second transmission device being functionally initiated by the press copying machine.

8. Handling system according to claim 7, wherein the press copying machine further includes an indicating device for indicating a state, the indicating device is connected to the second transmission device.

9. Handling system according to claim 7, wherein the press copying machine further includes means for reading further information which is optically stored in the credit card or the like and for handling information in connection with remaining information obtained.

10. Handling system according to claim 7, wherein the press copying machine further includes means for reading further information which is magnetically stored in the credit card or the like and for handling information in connection with remaining information obtained.

11. Handling system according to claim 1, wherein said second state receiving and digesting device further includes a coded random number generator generating a random code, a state inputted into the information storing means is joint information of credit card information and the random code.

* * * * *